United States Patent

Gluck et al.

Patent Number: 5,948,104
Date of Patent: Sep. 7, 1999

[54] SYSTEM AND METHOD FOR AUTOMATED ANTI-VIRAL FILE UPDATE

[75] Inventors: Allen Gluck, Spring Valley, N.Y.; Judah L. Lando, Kvar Vidkin, Israel

[73] Assignee: Neuromedical Systems, Inc., Suffern, N.Y.

[21] Appl. No.: 08/862,755

[22] Filed: May 23, 1997

[51] Int. Cl.⁶ .................................................. G06F 11/34
[52] U.S. Cl. .................. 713/200; 395/183.14; 380/4; 380/25
[58] Field of Search .............. 380/4, 25; 395/186, 395/183.14

[56] References Cited

U.S. PATENT DOCUMENTS

| | | | |
|---|---|---|---|
| 4,763,271 | 8/1988 | Field | 364/466 |
| 5,121,345 | 6/1992 | Lentz | 364/550 |
| 5,280,518 | 1/1994 | Danler et al. | 379/100 |
| 5,319,776 | 6/1994 | Hile et al. | 395/575 |
| 5,359,659 | 10/1994 | Rosenthal | 380/4 |
| 5,398,196 | 3/1995 | Chambers | 364/580 |
| 5,440,723 | 8/1995 | Arnold et al. | 395/181 |
| 5,444,850 | 8/1995 | Chang | 395/200.1 |
| 5,502,815 | 3/1996 | Cozza | 395/183.14 |
| 5,509,120 | 4/1996 | Merkin et al. | 395/186 |
| 5,511,163 | 4/1996 | Lerche et al. | 395/183.04 |
| 5,511,184 | 4/1996 | Lin | 395/734 |
| 5,537,540 | 7/1996 | Miller et al. | 395/183.14 |
| 5,559,960 | 9/1996 | Lettvin | 395/186 |
| 5,577,244 | 11/1996 | Killebrew et al. | 395/703 |
| 5,675,711 | 10/1997 | Kephart et al. | 395/22 |
| 5,771,354 | 6/1998 | Crawford | 395/200.59 |
| 5,802,277 | 9/1998 | Cowlard | 395/186 |

*Primary Examiner*—Ly V. Hua
*Attorney, Agent, or Firm*—Renner, Otto, Boisselle & Sklar, P.L.L

[57] ABSTRACT

A method and system for updating virus signature files of a computer system. The method includes the steps of storing first update data on a storage medium including second update data to be installed to the computer system, and installing the second update data to the computer system wherein the first update data includes virus signature updating data. The system includes: a least one computer and the portable storage medium adapted to deliver data to the at least one computer. The portable storage medium includes first and second data wherein the first data includes virus signature update data.

15 Claims, 5 Drawing Sheets

SYSTEM AND METHOD FOR AUTOMATED ANTI-VIRAL FILE UPDATE

TECHNICAL FIELD

The present invention relates generally to a system and method for detecting computer viruses, and more particularly to a system and method for updating the antivirus files of a computer system.

BACKGROUND OF THE INVENTION

The field of computers has been plagued over the years with computer viruses. A computer virus is a program that is executed without the knowledge or authorization of the user of the computer—the virus typically performing unauthorized and undesirable actions on components of the computer and/or information stored on the computer.

These programs are often introduced for malicious reasons, and frequently result in substantial damage to the computer and/or data stored on the computer. For example, some viruses alter or destroy data stored on the computer hard drive, scramble characters on video display screens, consume computer or network resources, oftentimes resulting in considerable downtime for the computer user and his office. In less serious cases, an attack by a computer virus may force an organization to replicate or recover data and files before it can resume normal operation. In more serious cases, data and files destroyed by a virus may become unrecoverable, forever shutting down that aspect of the organization's operations. Additionally, in some cases the integrity of an organization's data bases may have been attacked without warning, and the organization continues operation using inaccurate data, possibly resulting in injuries, losses and damages.

Computer viruses have the particular property of being able to replicate themselves and thus spread from one computer file to another, one computer volume to another, and one machine to another. The viruses may be spread in a number of ways. For example, a virus may spread by adding itself to code that already exists within some program on a computer, then changing that preexisting code in such a way that the newly added viral code will be executed. This enables the virus to execute again and replicate itself in yet another program.

Viruses typically propagate by opportunistically copying themselves to ("infecting") a disk that happens to be accessible when a computer executes the virus. If a user transports an infected disk to a second computer and the second computer executes the virus, the virus then attempts to infect disks on the second computer, and so on.

Many software solutions have been devised to help counter these viruses such as for example virus scanner programs. The virus scanner program scans a file or set of files for particular known viruses. Typically, these "anti-virus" programs both detect and remove known viruses. The anti-virus program searches for "signatures", including characteristic behaviors of viruses and removes any found virus. These programs are generally successful at eliminating the viruses that are known to the scanner program. However, viruses are oftentimes created by malicious computer hackers who are continuously producing new and more damaging computer viruses. It is estimated that at least several new viruses are introduced each day.

Although the virus detection programs are good at detecting and eliminating viruses, they are limited in that they can generally only detect viruses known to them via their virus signature files. The anti-virus program relies on a fairly extensive library of known computer viruses. As a result, new viruses with signatures not listed in the virus signature files of a computer oftentimes will go by undetected. Thus, signature scanning programs require frequent updates to keep them current with the increasing number of viruses. If the antivirus developer is lax in providing updates, or the user is lax in obtaining and employing available updates, a signature scanning anti-virus program can rapidly lose its effectiveness. Consequently, the new virus may be able to damage the computer and/or the information stored thereon. Therefore, a conventional virus detection program may become obsolete within only a few months after installation.

Furthermore, the aforementioned updating problem is not solely limited to virus signature files but also is prevalent in other areas where particular software utilizes reference files that need to be updated frequently in order for the system using the software to operate at peak efficiency.

Accordingly, in light of the above, there is a strong need in the art for an improved system and method for updating the virus signature files of a computer and/or computer system without putting the onus of updating on the user so that an anti-virus program stored thereon will be able to detect and eliminate viruses including newly created ones. Moreover, there is a strong need in the art for an improved system and method for updating reference files of a computer and/or computer system without putting the onus of updating on the user.

SUMMARY OF THE INVENTION

The present invention in particular relates to a system and method for updating virus signature files of a computer and/or computer system so that an anti-virus program stored thereon will be able to detect and eliminate viruses including newly created ones. However, as will be discussed below, the present invention has applicability to updating reference files of a computer and/or computer system without putting the onus of updating on the user.

Briefly, the present invention provides a set of virus signatures files on a storage medium such as a floppy disk or CD-ROM that is being used to install a program, files or other data to a computer or computer system. Along with the program or data being installed, the virus signature update files are also provided to the computer or computer system. The virus signature update files being downloaded include the most recently available signatures for known viruses. The computer or computer system receiving the files updates its current virus signature files to include any new virus signatures that are being downloaded. As a result, whenever, an anti-virus program is executed by the computer or computer system, it will be able to detect new types of viruses via the newly added virus signatures.

As was mentioned above, the present invention can also be utilized to update any suitable reference files of a computer and/or computer system without putting the onus of updating on the user.

According to embodiment of the present invention, a method for updating virus signature files of a computer system is provided including the steps of: storing first and second update data on a portable storage medium to be installed to the computer system, the first update data including virus signature updating data, the second data including data that is regularly delivered to the computer system; and installing the second update data to the computer system.

According to yet another embodiment of the present invention, a portable storage medium for updating data of a computer is provided including: first and second data; wherein the first data includes virus signature update data and the second data includes data that is regularly delivered to the computer.

According another embodiment of the present invention, a computer system is provided including: a least one computer; and a portable storage medium adapted to deliver data to the at least one computer, the portable storage medium including first and second data; wherein the first data includes virus signature update data.

In accordance with yet another aspect of the invention, a method for updating reference files of a computer system is provided including the steps of: storing first and second update data on a portable storage medium to be installed to the computer system, the first update data including reference file updating data, the second data including data that is regularly delivered to the computer system; and installing the second update data to the computer system.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
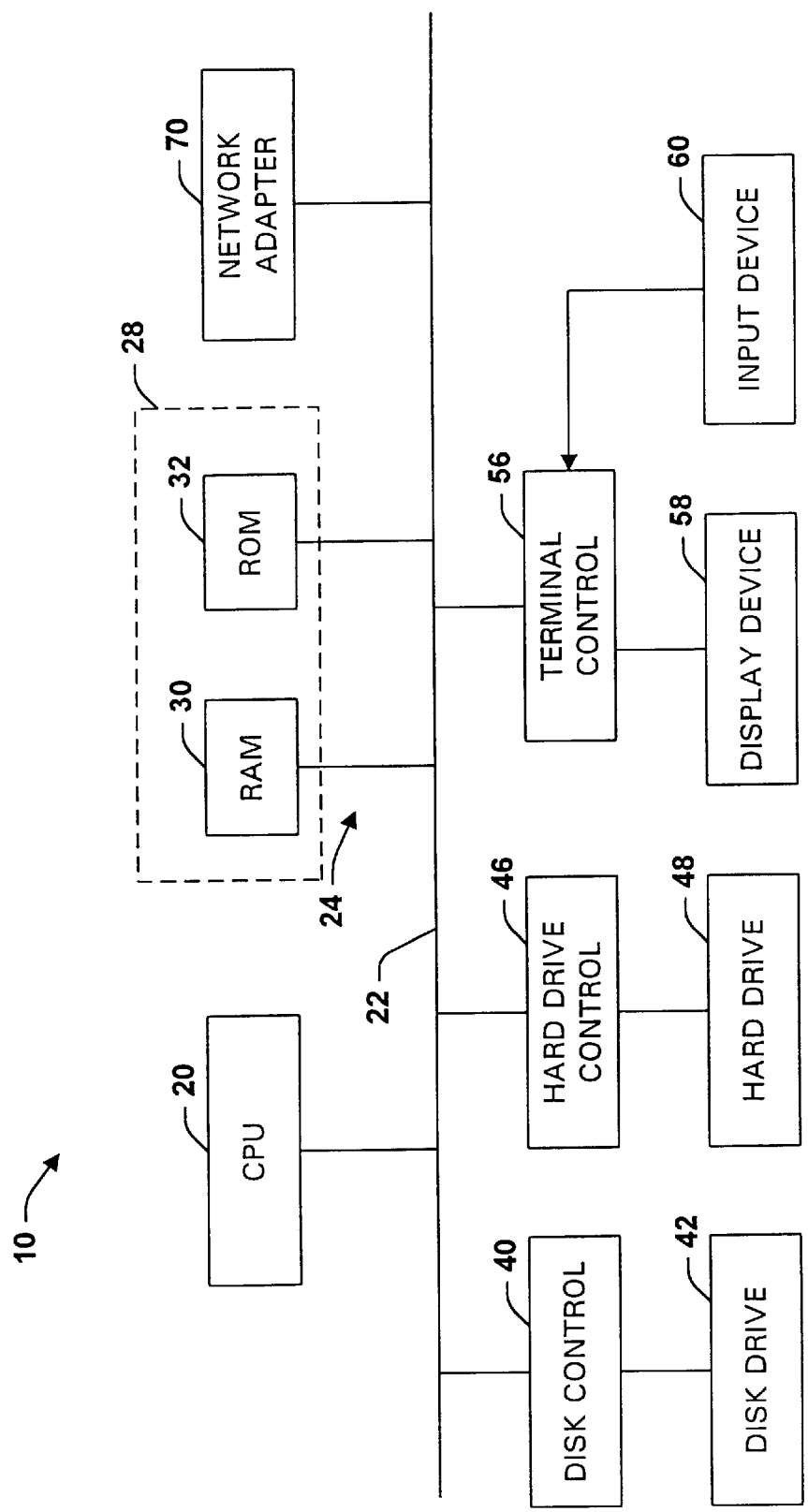
FIG. 1 is a block diagram of a computer system in accordance with the present invention.

The present invention will now be described with reference to the drawings, wherein like reference numerals are used to refer to like elements throughout.

As is mentioned above, the present invention relates to a system and method for updating virus signature files of a computer and/or computer system so that an anti-virus program stored thereon will be able to detect and eliminate viruses including newly created ones. The present invention provides a set of updated virus signatures files on a recording medium such as a floppy disk or CD-ROM that is being used to install a program, files or other data to a computer or computer system. Along with the program or data being installed, the updated virus signatures files are also provided to the computer or computer system. The virus signature files being downloaded include the most recently available signatures for known viruses. The computer or computer system receiving the files updates its current virus signature files to include any new virus signatures that are being downloaded. Thus, according to the present invention, a computer system's virus signature files are automatically updated with the installation of new data and/or programs.

The anti-virus program executed by the computer or computer system, will be regularly updated so that it will be able to detect new types of viruses via its newly added virus signatures.

Referring initially to FIG. 1, a detailed block diagram of a computer system 10 is shown in accordance with the present invention. The computer system 1 0 includes a central processing unit (CPU) 20 which is coupled to a bus 22. The CPU or processor 20 can be any of a plurality of processors, such as the 486DX/33, 486DX2/66, 486DX4/50-100, 486DX4/33-100, 486DX4/33-83, p24T, Pentium 50/75, Pentium 60/90, and Pentium 66/100, and other similar and compatible processors. The processor 20 functions to perform various operations described herein as well as for carrying out other operations related to the system 10. The manner in which the processor 20 can be programmed to carry out the functions relating to the present invention will be readily apparent to those having ordinary skill in the art based on the description provided herein.

The bus 22 includes a plurality of signal lines 24 for conveying addresses, data and controls between the CPU 20 and a number of other system bus components. The other system bus components include a memory 28 (including a Random Access Memory (RAM) 30 and a Read Only Memory (ROM) 32) and a plurality of input/output (I/O) devices. The memory 28 serves as data storage and may store appropriate operating code to be executed by the processor 20 for carrying out the functions described herein.

The RAM 30 provides program instruction storage and working memory for the CPU 20. The ROM 32 contains software instructions known as the Basic Input/Output System (BIOS) for performing interface operations with the I/O devices. Also stored in the ROM 32 is a software routine which operates to load a boot program from the booting device. The boot program will typically be executed when the computer system 10 is powered on or when initialization of the system 10 is needed.

The I/O devices include basic devices such as data storage devices (e.g., floppy disks, tape drives, CD ROMs, hard disks, etc.). Typically, the I/O devices communicate with the CPU 20 by generating interrupts. The CPU 20 distinguishes interrupts from among the I/O devices through individual interrupt codes assigned thereto. Responses of the CPU 20 to the I/O device interrupts differ, depending, among other things, on the devices generating the interrupts. Interrupt vectors are provided to direct the CPU 20 to different interrupt handling routines.

The interrupt vectors are generated during initialization (i.e., boot up) of the computer system 10 by execution of the BIOS. Because responses of the CPU 20 to device interrupts may need to be changed from time to time, the interrupt vectors may need to be modified from time to time in order to direct the CPU 20 to different interrupt handling routines. To allow for modification of the interrupt vectors, they are stored in the RAM 30 during operation of the computer system 10.

A disk control subsystem 40 birectionally couples one or more disk drives 42 (e.g., floppy disk drives, CD-ROM drives, etc.) to the system bus 22. The disk drive 42 works in conjunction with a removable storage medium such as a floppy diskette or CD-ROM.

A hard drive control subsystem 46 bidirectionally couples a rotating fixed disk, or hard drive 48 to the system bus 22. The hard drive control subsystem 46 and hard drive 48 provide mass storage for CPU instructions and data.

A terminal control subsystem 56 is also coupled to the bus 22 and provides output to a display device 58, typically a CRT monitor, and receives inputs from a manual input device 60 such as a keyboard. Manual input may also be provided from a pointing device such as a mouse.

A network adapter 70 is provided for coupling the system 10 to a network.

The components illustrated in FIG. 1 may be embodied in a personal computer, a portable computer, a workstation, a minicomputer, a main frame computer, or a super computer. As such, the details of the physical embodiment of the data processing system 10 such as structure of the bus 22 or the number of CPUs 20 that are coupled to the bus 22, is not crucial to the operation of the invention and thus is not described in further detail below.

The computer system 10 scans all relevant media (e.g., files, boot records, memory, etc.) for the presence of known viruses in the following manner. A pre-existing virus scanner is activated to search for a large set of patterns or signatures, each of which pertains to a different virus or virus family. The signature scanner operates by knowing what a target virus will look like based on the "signature" code for that virus and then scanning for these program codes in any program requested to be executed or otherwise requested to be scanned. As long as the signature codes are sufficiently long enough so as not to be confused with another's program code, then positive identification is virtually guaranteed and the request to execute the infected program can be stopped before execution ever begins.

It is preferred (but not essential) that the virus scanner be capable of detecting slight variations on known viruses. Many conventional scanners possess this capability, to a limited extent, because they search based on short contiguous strings of bytes found in the virus. This is particularly useful for detecting variations of known viruses because it permits a certain number of mismatches between a string of bytes in a file being examined and the virus signature string. If a virus is found, the user is alerted, and the virus is eliminated by traditional methods such as restoration from backup (either automatically or manually by the user) or disinfection (removal of the virus from all of the software it has infected.) In general disinfection is only acceptable if the virus is found to be an exact copy of a known virus. This implies that the system 10 verify the identification made by the virus scanner.

As mentioned above, the virus scanner bases its search on known virus signatures. These signatures are a sequential portion of code, typically up to 16 bytes in length, unique to each virus. Those of skill in the art are familiar with the signatures of many known viruses, and lists of such viruses (including their signature) are often published in various technical bulletins, which are periodically updated.

Figure 2:
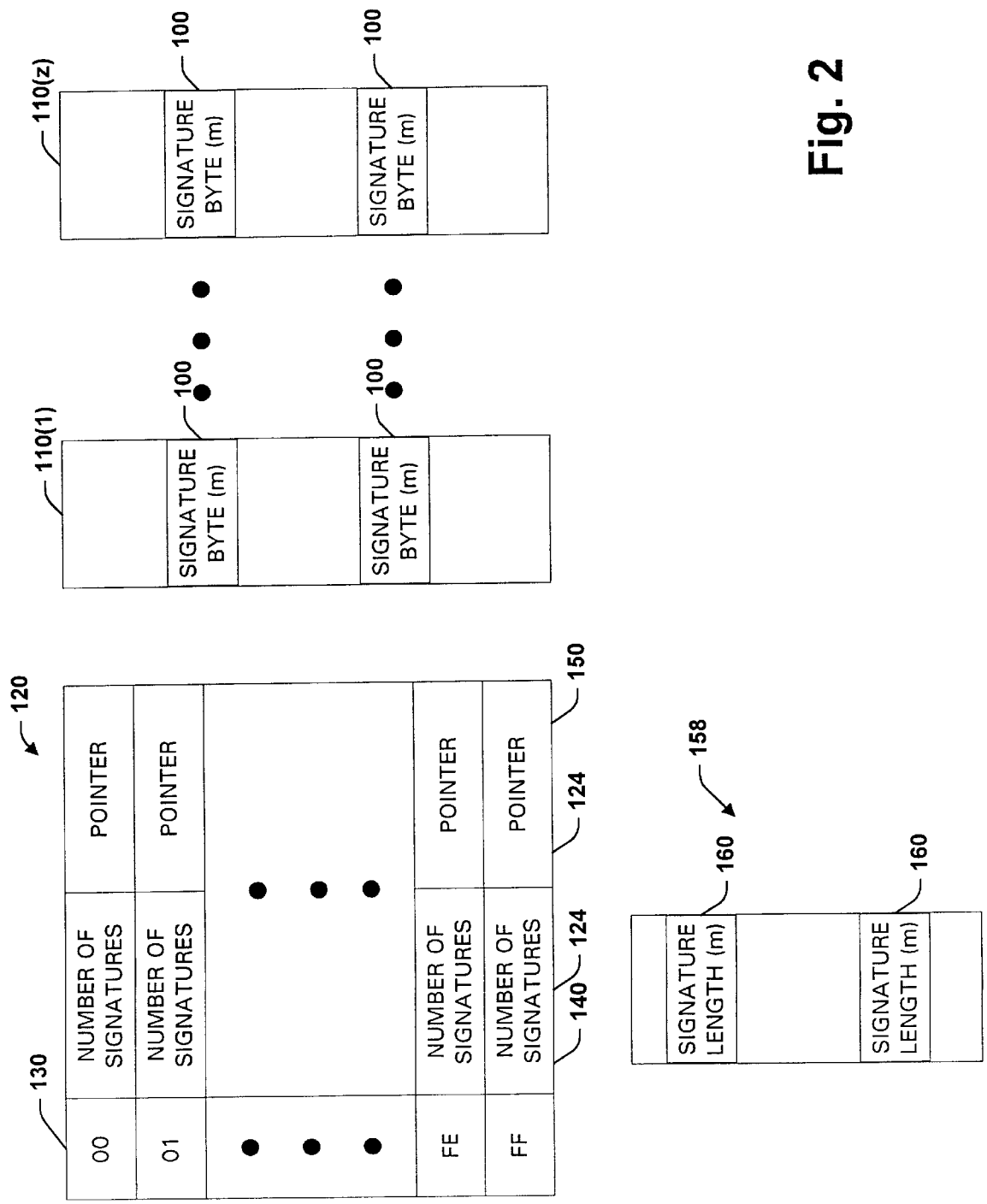
FIG. 2 is a representative table diagram of virus signature files in accordance with the present invention.

To facilitate an efficient signature scan function, and to prevent the stored virus signatures themselves from causing false alarms, the signatures are stored in a series of tables as illustrated in FIG. 2. In the preferred embodiment, the signature table is stored in the permanent memory of the computer system 10. Each signature element 100 in signature tables 110(1) through 110(z) contain the value of one byte of one virus signature: that is, the nth element in signature 110(1) contains the second byte in the nth virus signature, the nth element of signature table 110(2) contains the third byte in the zth virus signature, and so on, through the signature table 110(z). Thus, the number of signature tables 110 provided should equal the length of the longest virus signature to be scanned for minus one, and the number of signature elements 100 in each signature table 110 should equal the number of virus signatures to be scanned for.

Furthermore, the signature elements 100 in the signature tables should be sorted according to ascending numerical order of the corresponding virus signatures.

In order to gain access to the signature tables 110 an index table 120 is preferably used. Each index element 124 of index table 120 corresponds to each possible byte value 130 for the first byte type of a virus signature; the table 120 should therefore have room for 256 elements which is the number of different values possible for one byte of data. The index elements 124 should be sorted in the ascending order of the corresponding byte values 130. Each index element 124 contains two fields: signature count field 140 which contains the number of virus signatures that begin with the corresponding byte value 130, and a pointer field 150, which specifies (index n) the location in subsequent tables 110(1) through 110(z) where the elements corresponding to signatures beginning with the byte value 130 are stored.

The foregoing data structure facilitates an efficient signature scan procedure. When memory is scanned, the first memory byte examined is used as an index to specify an index element to 124 in index table 120. If signature count field 140 indicates that no signatures begin with this byte, the scan process is restarted for the next byte in memory. If signature count field 140 in the specified index element indicates that one or more virus signatures do begin with the byte being examined, then the relevant signature elements 100, stored in signature tables 110(1) through 110(z), as determined from pointer field 150, are compared to successive bytes in memory until either a complete virus signature match is found, or until the memory being examined is fully scanned. For purposes of knowing when a signature match is complete, an extra signature length table 158 is preferably provided, wherein the mth length element 160 of the signature length table 158 contains the length of the virus signature corresponding to the zth elements of the table 110.

Returning back to the search, main memory (which may include any extended, expanded or other additional RAM memory included within the computer system 10) preferably is scanned first because there are a number of "stealth" viruses that avoid detection by hiding in a memory before a program is run. Preferably, system files (such as COMMAND.COM) are also searched, as are boot strap loader records, including those on any floppy disks in place. If desired, scanning of system files and boot records can be skipped to improve speed, but at some loss in security.

Figure 3:
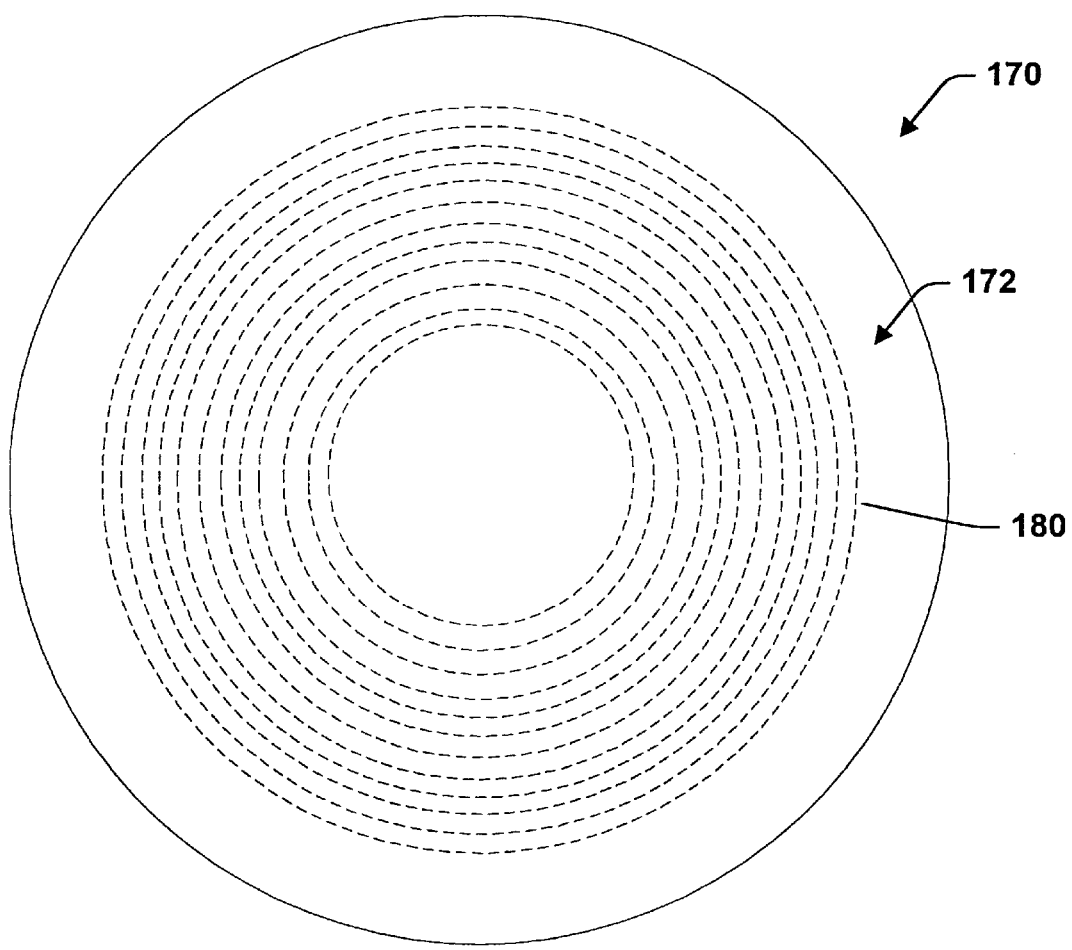
FIG. 3 is an elevation view of a portable storage medium in accordance with the present invention.

Turning now to FIG. 3, a preferred portable storage medium 170 is shown in accordance with the present invention. The preferred storage medium is a diskette with representative tracks 172, each track having sectors such as for example sector 180. In the preferred embodiment all tracks contain two additional sectors to provide for 160 KB of hidden partitions on an 80-track diskette. The virus signature update data is stored thereon so as to be inaccessible to some degree to conventional programs. By storing the update data in the hidden partitions, conventional storage capacity of the storage medium is not reduced. The virus signature update data is preferably stored in a compressed form and decompressed prior to installation to system 10.

The two additional sectors at the end of each track provide a rotational delay between the last conventional sector. The delay provides the disk drive 42 enough time to reposition the head on the next track before the first sector of the next track passes under the head thereby speeding up access to data on the diskette. However, it will be appreciated that the present invention has applicability to any suitable storage medium (e.g., diskette, CD-rom, tape drive, etc.).

Figure 4:
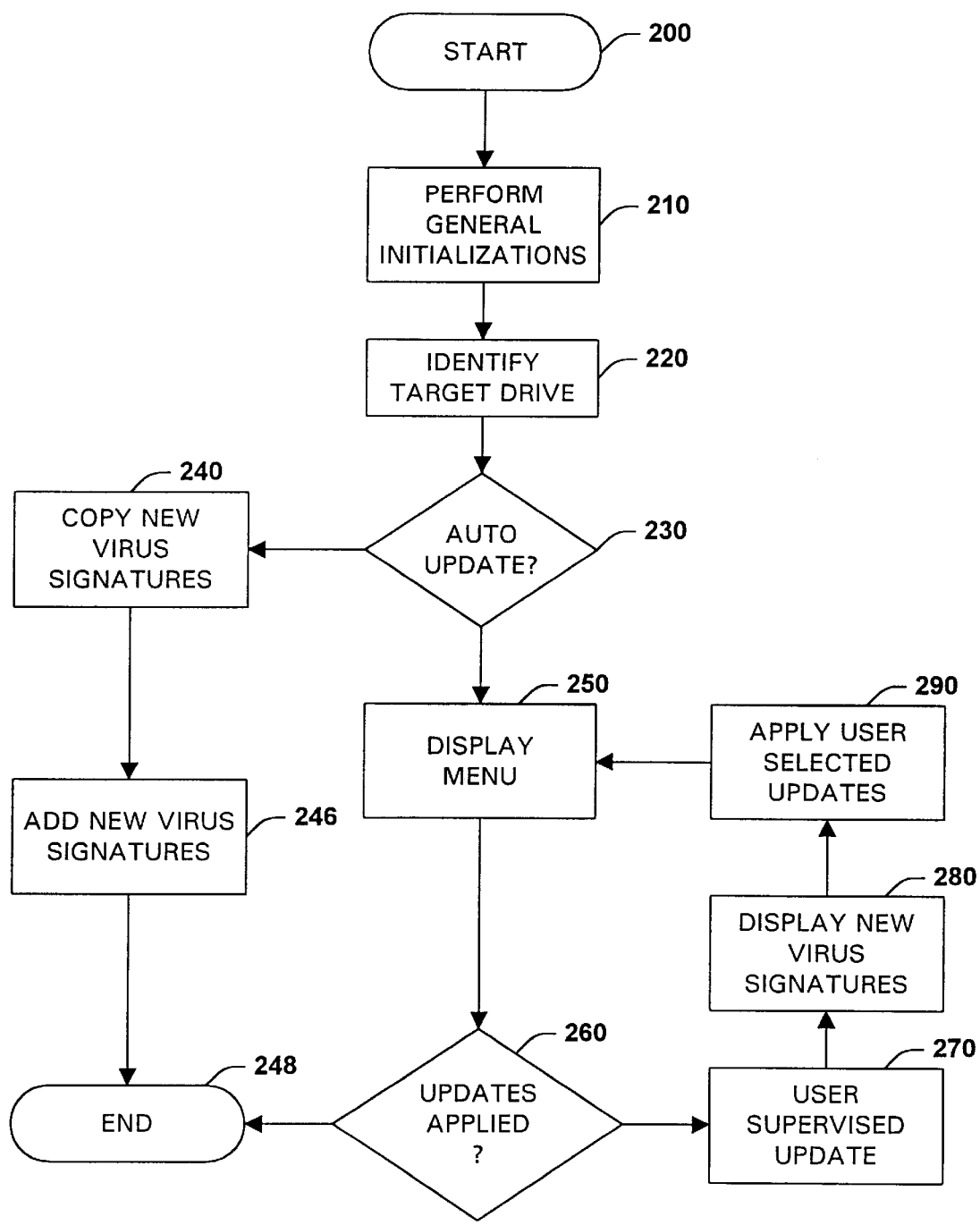
FIG. 4 is a system flowchart illustrating one embodiment of the present invention.

Referring now to FIG. 4, a flowchart that represents the general operations the present invention is shown. Set out below is an illustration of the update program for applying virus signature modifications or updates to the virus signature files 110 of the system 110. The update program is in program design language from which source code and machine code are derivable. In the following general description of the update program, it is to be assumed that system 10 is under mouse and keyboard device control. Moreover, it is assumed that the update program is invoked from a driver program contained in the operating system which facilitates the display of all of the screen panels, the monitoring of the keyboard 22 and the installation of the plurality of separately installable features or components of the software program.

If the user has selected the prompted mode, the update program then applies all unapplied updates to all of the installed features or components prior to returning control to the operating system. If the user has selected the full function mode, the update program prepares a screen panel which displays a list of all of the features or components of the software program installed on system 10 and respective value of the highest sequential update that can be applied to each of the features. Thereafter, when the update program returns control to the driver program, the driver program displays to the user on the display 20 the prepared screen panel. The user is then permitted to lower any of the update values associated with any of the displayed features.

At step 200, in response to an initialization, or power-up signal the processor 20 executes a brief program stored in the ROM 32 which is an integral part of processor 20 loading a boot loader program stored in a predetermined location of the portable storage medium 170 (i.e., disk) that is inserted in the disk drive 42. In step 210, the processor 20 performs general initializations in a conventional manner, well known to those skilled in the art. At step 220, in response to the initialization signal, the processor 20 may load an update program, which is stored in locations corresponding to the boot loader on the disk 170. The boot loader program then loads the system program stored on the disk 170 into the memory of system 10 and transfers control to the systems program. The systems program identifies the target drive to load the general data stored on the disk 170. The system program also identifies the target drive and path to the system's virus signature files 110.

At step 230, the processor 20 prompts the user if an auto update is desired. In this prompted mode, which is intended for use by less sophisticated users, a method of updating the virus signature files 110 with a minimum number of decisions is provided. A full function mode, which is intended to be used by sophisticated users, provides a menu driven method enabling the user to select (1) different functions of the update program and (2) the order of execution of the selected functions. If in step 230 the decision to auto update is yes, the processor 20 proceeds to step 240. In step 240, the processor copies the new virus signature data from the disk to a memory buffer (not shown) of the system 10. The processor 20 in step 246 updates the virus signature files 110 with the new virus signature data from the disk 170.

If in step 230, the user does not desire an auto update the processor 20 proceeds to step 250. In step 250 a display menu is made available to the user. The display menu may provide a number of user options some of which are related to updating the virus signature files 110. In step 260, the processor 20 determines if the virus signature update files have been applied. If yes, the processor 20 ends this routine and proceeds to handle other matters. If no, the processor 20 proceeds to step 270 where the user is presented an option to supervise the updating of the virus signature files 110. In step 280, the user is displayed the virus signature update data from the disk 170 and is allowed to manually select which new virus signatures he/she wants to apply to the virus signature files 110. It will be appreciated that brief descriptions of the various viruses can be coupled to the respective virus signatures in order to facilitate the user making his/her selection.

In step 290, the processor 20 applies the user selected virus signature update files and thus updates the virus signature files 110. After step 290, the processor 20 returns to step 250. It will be appreciated that a variety of steps can be added to this process or even some steps removed to carry out the present invention all of which fall within the scope of the present invention.

Figure 5:
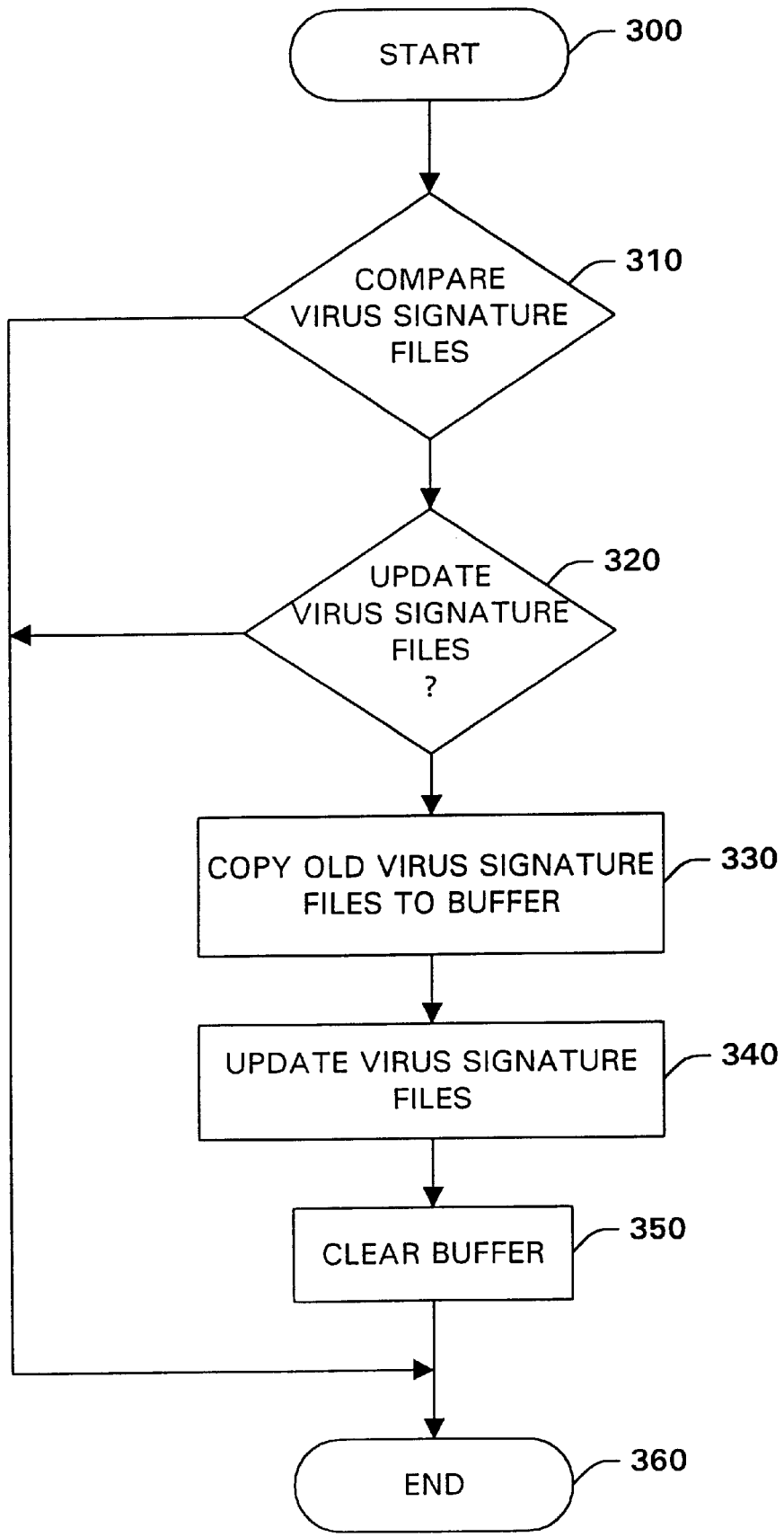
FIG. 5 is a system flowchart of another embodiment of the present invention.

FIG. 5 is a flowchart depicting another embodiment of the present invention. At step 300, the user inserts the storage medium 42 into a computer that is part of the system 10. In step 310, the processor 20 of the computer compares the versions of virus signature update files on the medium against the virus signature files 110 on the system 10. If all of the update virus signature files on the storage media are the same or older than that stored in the virus signature files 110 on the system 10 the processor 20 proceeds to step 360 where it carries on routine operations of associated with the system 10.

However, if in step 310 the processor determines that at least one of the virus signature update files is not found in the virus signature files 110 of the system 10, the processor 20 proceeds to step 320 where it prompts the user to decide whether to update the virus signature files 110. If the user decides no, the processor 20 advances to step 360 where it carries on routine operations of associated with the system 10. If the user decides that he/she does wish to update the virus signature files 110, the processor 20 proceeds to step 330 where it copies the old versions of the virus signature files 110 to a temporary buffer (to save for use in case the update is not completed properly. Then in step 340, the processor 20 adds the virus signature updates to the virus signature files 110. In this step, duplicate virus signature files are overwritten with the updated versions and the virus signature updates that are new to the system are added to the virus signature files 110.

The entire virus signature file 110 is not completely overwritten with the update virus signature files since the storage medium 170 might only contain new virus signatures rather than a comprehensive list of all virus signatures. Thus, an updating is preferably performed as opposed to a complete new installation of virus signature files. After step 340 is complete successfully, the processor 20 in step 350 clears the buffer then proceeds to step 360 where it carries on routine operations of associated with the system 10.

The present invention thus allows for a user to update the virus signature files of his/her system without having to go out of his/her way in order to update the virus signature files 110. The present invention may be employed in almost any environment where computers are involved, however, it is particularly useful in the medical industry where system and file integrity in critical.

For example, the present invention may be used in the cell classification industry where speed and accuracy of cervical smear analysis is critical. The examination of a cervical smear by what often is referred to as a PAP test is a mass screening cytological examination which requires inspection of hundreds of thousands of cells per slide. The screening process has become automated to the extent that images are taken of the thousands of slides. The images are stored on a transportable storage medium 170 such as a disk for review and analysis at a remote site. It is critical that the systems used in performing the cytological examinations be virus free. Otherwise, possible misdiagnosis might result which could in turn result in a person having cervical cancer go undetected.

The present invention may be employed in this field by attaching virus update files to the storage medium 170 that is storing the cervical smear images. Thus, when the images are being downloaded at the remote site for analysis the virus update files can be applied to the computer system 10 of the remote site in the manner described above. Thus, in environments such as this where data is being regularly downloaded to a system the present invention facilitates detection of viruses thus providing increased protection from system and file corruption due to infection by a computer virus.

The present invention is not limited to simply updating virus signature files 110 but may also be employed in other environments where reference files must be meticulously updated to ensure system operating efficiency. For example, in a business/legal environment reference files are maintained containing benchmark data that is used in conjunction with various software applications. For instance in a law firm database rules, regulations and various statutory dates and deadlines are stored in files that are referenced by software applications that use the reference data in making computations and decisions. If the reference data is incorrect, then it is highly probable that the output computation and/or decision made by the software is erroneous. Thus, if update reference data were stored on a storage medium 170 in conjunction with regular data that is to be applied to the system 10 (in a similar manner to that described above with respect to the virus signature updates), the system 10 would be using the most recent reference data.

Those skilled in the art will recognize that the embodiment described above and illustrated in the attached drawings are intended for purposes of illustration only and that the subject invention may be implemented in various ways. Thus, it is to be understood that the embodiments described above are not to be considered as limiting and limitations on the subject invention are to be found only in the attached claims.

What is claimed is:

1. A method for updating virus signature files of a computer system comprising the steps of:

storing first and second update data on a portable storage medium to be installed to the computer system, the first update data including virus signature updating data, the second data including data that is regularly delivered to the computer system;

installing the second update data to the computer system; and prompting a user of the computer system to decide whether or not to update the virus signature files with the first data.

2. The method of claim 1 further including the step of updating the virus signature files with the first data.

3. The method of claim 1 wherein the storage medium is a floppy diskette.

4. The method of claim 1 wherein the storage medium is a CD-ROM.

5. The method of claim 1 wherein the virus signature files are automatically updated with the first data when the second data is being delivered to the computer system.

6. The method of claim 5 wherein the first data is decompressed prior to being used to update the virus signature files.

7. The method of claim 1 wherein the second data includes an executable software program.

8. The method of claim 1 wherein the storage medium is a removable medium adapted to be read by the computer system.

9. The method of claim 1 further including the step of the user selecting at least one portion of the first data to be used to update the virus signature files.

10. The method of claim 1 wherein the portable storage medium further includes a hidden partition comprising storage space inaccessible to conventional programs and not reducing conventional storage capacity of the storage medium, wherein the first data is stored thereon.

11. A method for updating virus signature files of a computer system comprising the steps of:

storing first and second update data on a portable storage medium to be installed to the computer system, the first update data including virus signature updating data, the second data including data that is regularly delivered to the computer system;

installing the second update data to the computer system; and displaying to the user a first target drive and directory where the virus signature files are stored.

12. A computer system comprising:

at least one computer;

a portable storage medium adapted to deliver data to the at least one computer, the portable storage medium including first and second data, wherein the first data includes virus signature data, the portable storage medium further including a hidden partition comprising storage space inaccessible to conventional programs and not reducing conventional storage capacity of the storage medium, wherein the first data is stored thereon.

13. A method for updating reference files of a computer system comprising the steps of:

storing first and second update data on a portable storage medium to be installed to the computer system, the first update data including reference file updating data, the second data including data that is regularly delivered to the computer system, the portable storage medium further including a hidden partition comprising storage space inaccessible to conventional programs and not reducing conventional storage capacity of the storage medium, wherein the first data is stored thereon; and installing the second update data to the computer system.

14. The method of claim 13 further including the step of updating the reference files with the data.

15. The method of claim 13 wherein the reference files are automatically updated with the first data when the second data is being delivered to the computer system.

* * * * *

UNITED STATES PATENT AND TRADEMARK OFFICE
CERTIFICATE OF CORRECTION

PATENT NO. : 5,948,104
DATED : Sep. 7, 1999
INVENTOR(S) : Gluck et al.

It is certified that error appears in the above-identified patent and that said Letters Patent is hereby corrected as shown below:

Col. 10, line 30 (counting line numbers), after "and" begin new sub-paragraph with "displaying";

Col. 10, line 58, before "data" insert --first--.

Signed and Sealed this

Ninth Day of May, 2000

Attest:

Q. TODD DICKINSON

*Attesting Officer*        *Director of Patents and Trademarks*